US008998043B2

(12) United States Patent
Fruit et al.

(10) Patent No.: US 8,998,043 B2
(45) Date of Patent: Apr. 7, 2015

(54) FLUID-COOLED VIBRATORY APPARATUS, SYSTEM AND METHOD FOR COOLING

(75) Inventors: Ronald Fruit, Woodstock, IL (US); Daniel T. Lease, Spring Grove, IL (US); Steve Massman, Poplar Grove, IL (US); Stephen McCabe, Lakemoor, IL (US); Paul Musschoot, Marengo, IL (US); Frederick Vroman, Wonder Lake, IL (US)

(73) Assignee: General Kinematics Corporation, Crystal Lake, IL (US)

(*) Notice: Subject to any disclaimer, the term of this patent is extended or adjusted under 35 U.S.C. 154(b) by 166 days.

(21) Appl. No.: 12/945,531

(22) Filed: Nov. 12, 2010

(65) Prior Publication Data

US 2011/0114290 A1 May 19, 2011

Related U.S. Application Data

(63) Continuation of application No. 11/627,245, filed on Jan. 25, 2007, now abandoned.

(51) Int. Cl.
| | | |
|---|---|---|
| *B22D 35/00* | (2006.01) | |
| *B03B 9/06* | (2006.01) | |
| *C03B 7/16* | (2006.01) | |
| *C03B 7/06* | (2006.01) | |
| *F27D 3/14* | (2006.01) | |
| *C21B 3/08* | (2006.01) | |

(52) U.S. Cl.
CPC ... *C03B 7/16* (2013.01); *C03B 7/06* (2013.01); *F27D 3/14* (2013.01); *C21B 3/08* (2013.01)

(58) Field of Classification Search
CPC .............. C03B 7/06; C03B 7/16; C21B 3/08; F27D 3/14

USPC .......... 222/590, 591; 266/196, 231, 227, 236, 266/46; 209/233–421, 11; 65/141
See application file for complete search history.

(56) References Cited

U.S. PATENT DOCUMENTS

| 399,263 A | 3/1889 | Hartman |
|---|---|---|
| 2,225,660 A | 12/1940 | Rogers |
| 2,663,051 A | 12/1953 | Graybeal |

(Continued)

FOREIGN PATENT DOCUMENTS

| EP | 1013616 | 6/2000 |
|---|---|---|
| JP | 48-8363 | 3/1973 |

(Continued)

OTHER PUBLICATIONS

International Search Report and Written Opinion for counterpart International Application No. PCT/US2008/051997, dated Jun. 19, 2008 (10 pages).

(Continued)

*Primary Examiner* — Scott Kastler
*Assistant Examiner* — Michael Aboagye
(74) *Attorney, Agent, or Firm* — Cook Alex Ltd.

(57) ABSTRACT

A vibratory apparatus includes a trough assembly comprising first and second plates, the first and second plates joined together in close proximity so as to define a space through which a fluid may pass at a high velocity, a vibration generator coupled to the trough assembly, and a frame resiliently coupled to the trough assembly. Also included is a system including the vibratory apparatus and other equipment, and a method of using the vibratory apparatus.

16 Claims, 5 Drawing Sheets

(56) References Cited

U.S. PATENT DOCUMENTS

| | | | |
|---|---|---|---|
| 2,827,279 A | | 3/1958 | Cox |
| 2,944,284 A | | 7/1960 | Tillotson et al. |
| 3,030,434 A | | 4/1962 | Gell |
| 3,417,930 A | * | 12/1968 | Brumagin et al. ............... 241/64 |
| 3,468,654 A | | 9/1969 | Torok |
| 3,630,480 A | * | 12/1971 | Inouye ........................... 249/106 |
| 4,106,921 A | | 8/1978 | Porter |
| 4,177,974 A | * | 12/1979 | Higuchi et al. ............... 266/196 |
| 4,446,995 A | | 5/1984 | Wooding |
| 4,522,377 A | * | 6/1985 | Degner ........................ 266/196 |
| 4,697,274 A | | 9/1987 | Enkner et al. |
| 4,722,483 A | | 2/1988 | Saville et al. |
| 4,909,837 A | | 3/1990 | Hansen et al. |
| 5,218,987 A | | 6/1993 | Heil |
| 5,433,765 A | | 7/1995 | Muniz et al. |
| 6,116,335 A | | 9/2000 | Beamer et al. |
| 6,189,818 B1 | * | 2/2001 | Kunz et al. ....................... 241/23 |
| 7,854,785 B2 | * | 12/2010 | Memoli et al. .................. 75/335 |

FOREIGN PATENT DOCUMENTS

| | | | | |
|---|---|---|---|---|
| JP | 08-135952 | * | 5/1996 | ................ F23J 1/00 |
| JP | 8246014 | | 9/1996 | |
| SE | 85432 | | 2/1936 | |
| WO | WO 83/01422 | | 4/1983 | |

OTHER PUBLICATIONS

Examination Report for counterpart EP Application No. 08728259.6, dated Jun. 7, 2010 (4 pages).

* cited by examiner

FLUID-COOLED VIBRATORY APPARATUS, SYSTEM AND METHOD FOR COOLING

BACKGROUND

This patent is directed to a vibratory apparatus and related methods, and, in particular, to a fluid-cooled vibratory apparatus and a method for cooling.

It is known in the art to provide a trough to guide a material between two points, and to cool the trough by passing a coolant, such as water, through the trough. U.S. Pat. No. 4,446,995 illustrates one such trough. Molten material, such as molten slag, moves from an elevated feed point to a lower discharge point along the trough under the force of gravity. Water is passed through a coolant guide disposed below the trough, from the feed end of the trough to the discharge end of the trough, and then back from the discharge end to the feed end. Great emphasis is placed in '995 patent on the use of copper for the trough, with the suggestion made that use of steel in such an application is a "technical felony."

It is also known to provide a trough to guide dross between two points in small amounts using a vibratory apparatus. The trough of the vibratory apparatus may be water-cooled by joining a plate to the trough to define a space adjacent to a surface of the trough, and then passing water through the space. Like the '995 patent, this trough is made of copper. Unlike the '995 patent, the velocity of the water through the space is significantly lower. Such a device was not considered appropriate for use in an application where a greater heat load would be experienced by the trough, either because a different material was to be transported along the trough or a greater volume of material was to be transported, or both.

SUMMARY

According to an aspect of this disclosure, a vibratory apparatus includes a trough assembly comprising first and second plates, the first and second plates joined together in close proximity so as to define a space through which a fluid may pass at a high velocity, a vibration generator coupled to the trough assembly, and a frame resiliently coupled to the trough assembly.

According to an aspect of this disclosure, a system includes a vibratory apparatus, which includes a trough assembly comprising first and second plates, the first and second plates joined together in close proximity so as to define a space through which a fluid may pass at a high velocity, a vibration generator coupled to the trough assembly, and a frame resiliently coupled to the trough assembly. The system also includes and a pump having an inlet in fluid communication with a fluid source and an outlet in fluid communication with the space.

According to an aspect of this disclosure, a method for cooling a material uses a vibratory apparatus comprising a trough assembly comprising first and second plates, the first and second plates joined together in close proximity so as to define a space through which a fluid may pass at a high velocity. The method includes feeding a material onto the trough assembly at a first point, vibrating the trough assembly to move the material along the trough assembly in a first direction to a second point, and passing a fluid through the space at a high velocity.

DETAILED DESCRIPTION OF VARIOUS EMBODIMENTS

Although the following text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
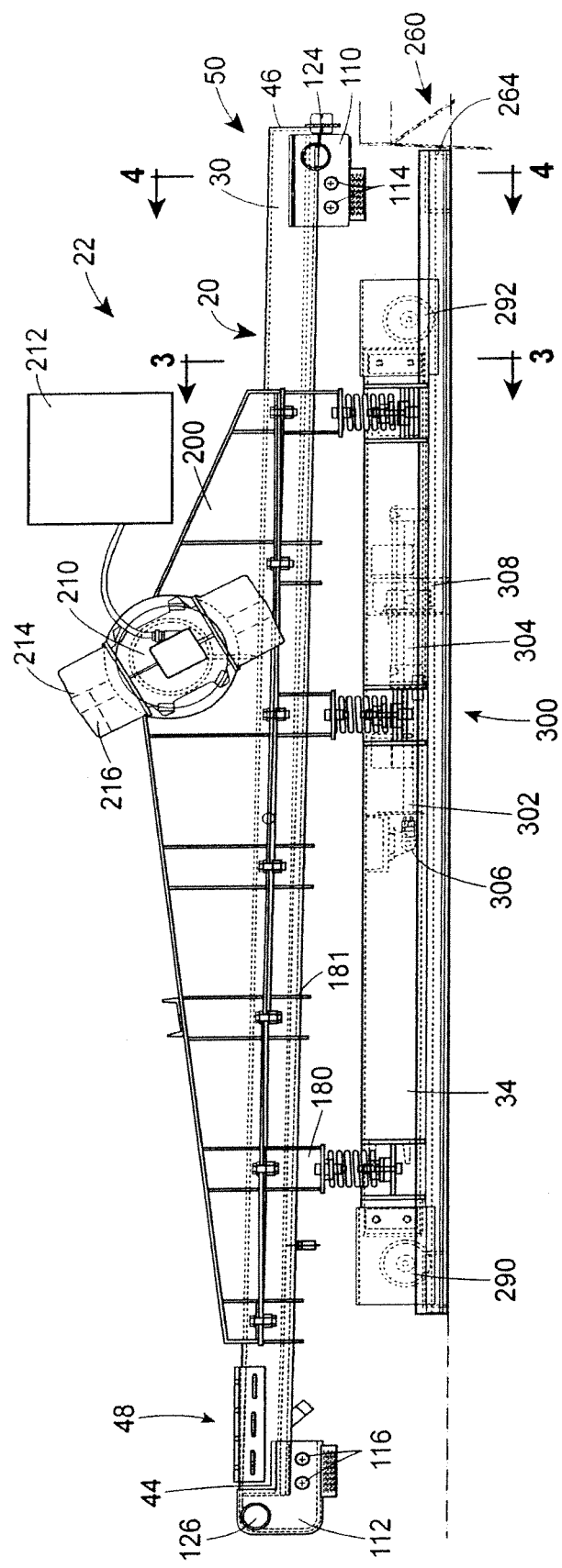
FIG. 1 is an elevational view of a vibratory apparatus according to the present disclosure.
Figure 2:
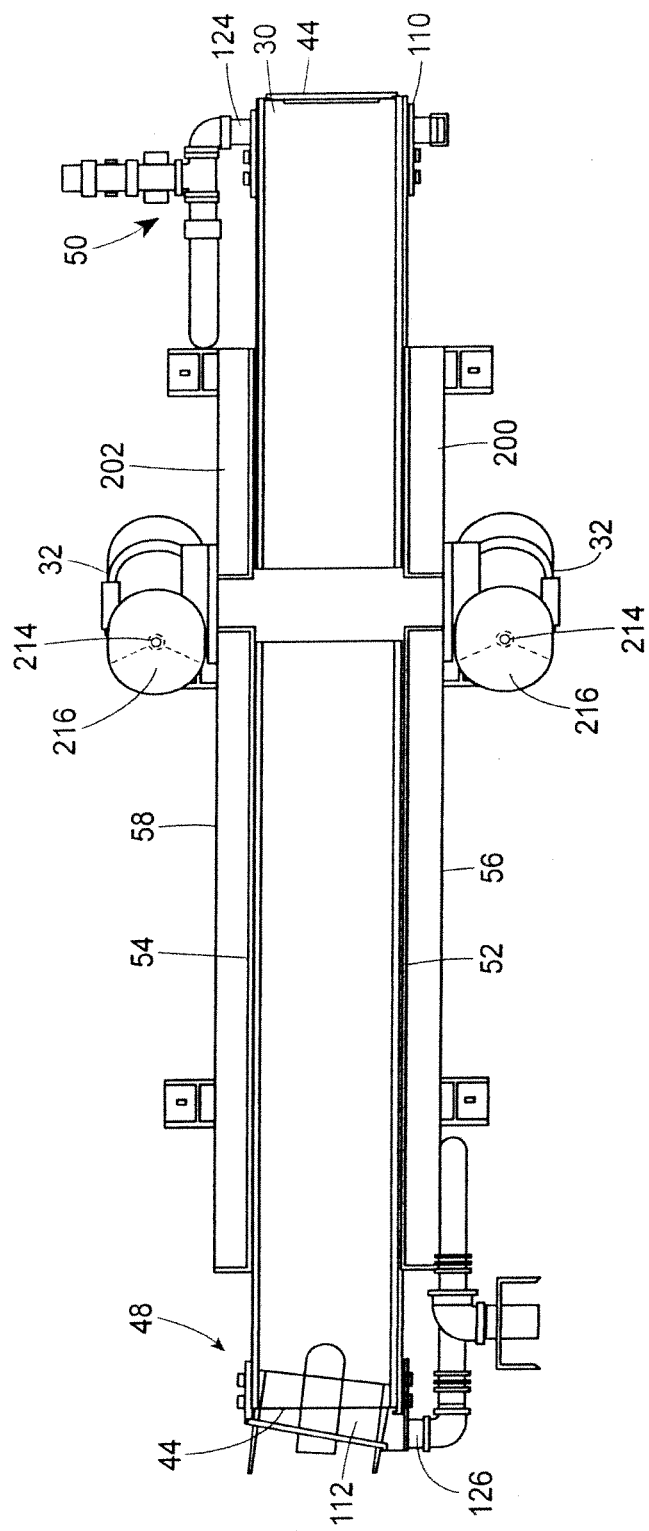
FIG. 2 is a plan view of the vibratory apparatus of FIG. 1, with the load plate assembly removed.
Figure 3:
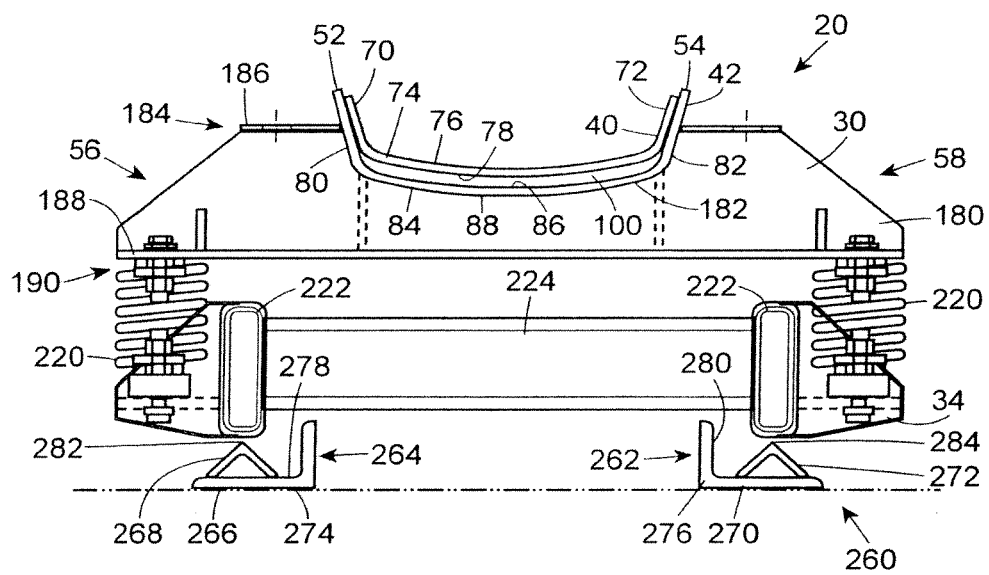
FIG. 3 is a cross-sectional view of the vibratory apparatus of FIG. 1 taken along line 3-3 in FIG. 1.

Referring first to FIGS. 1-3, a fluid-cooled vibratory apparatus 20 is shown. The fluid-cooled vibratory apparatus 20 may be part of a system 22, which may include, for example, equipment to circulate the fluid (water, for example) through the vibratory apparatus 20. The system 22 may also include equipment to move the vibratory apparatus 20 relative to the ground, so as to change the alignment of feed and discharge points of the apparatus 20 relative to other equipment, for example. Further discussion of the system 22 will be taken up below as appropriate.

As seen in FIG. 1, the vibratory apparatus 20 may include a trough assembly 30, one or more vibration generators 32, and a support frame 34. While the vibratory apparatus 20 may be assembled as a feeder, as illustrated, it will be recognized that the vibratory apparatus 20 could just as well be assembled as a conveyor.

As seen in FIGS. 2 and 3, the trough assembly 30 in turn may include first and second trough plates 40, 42 having ends 44, 46 that may be spaced in a longitudinal direction between a first (or feed) end 48 and a second (or discharge) end 50 of the trough assembly 30. The trough plates 40, 42 may also have spaced side edges 52, 54 that may extend between first and second sides 56, 58 of the trough assembly 30 in a lateral direction. As also illustrated, the first plate 40 may be described as disposed "above" the second plate 42, although this orientational convention is assumed simply for ease of discussion.

As is best illustrated in FIG. 3, the first and second plates 40, 42 may be catenary in shape. In particular, the first plate 40 has opposing sides 70, 72 and a curved floor 74, and opposing surfaces 76, 78. Similarly, the second plate 42 has opposing sides 80, 82 with a curved floor 84, and opposing surfaces 86, 88. Again for ease of discussion, the convention may be adopted that surfaces 76, 86 are the "top" surfaces of the plates 40, 42 and that surfaces 78, 88 are the "bottom" surfaces of plates 40, 42.

The first and second plates 40, 42 may be joined together along their first and second side edges 52, 54 to form a space 100 between opposing bottom and top surfaces 78, 86. As illustrated, the dimension of the first plate 40 between the side edges 52, 54 may be smaller than that of the second plate 42, such that the first plate 40 nests within the second plate 42, with the sides 70, 72 abutting the sides 80, 82 and the floor 74 spaced from the floor 84. Alternatively, the plates 40, 42 could have been planar in nature, with the spacing between the opposing surfaces 78, 86 maintained, for example, through the use of a spacer bar or bars disposed at the first and second side edges 52, 54. Instead, as illustrated, the sides 70, 72 may be joined directly to the sides 80, 82 and the surfaces 78, 86 are maintained in a spaced relation because of the shapes and relative dimensions of the plates 40, 42. The plates 40, 42 may be joined by welding the sides 70, 72, 80, 82 of plates 40, 42 together, or other methods of joining, such as through the use of fasteners (e.g., nut-and-bolt), may be used.

The catenary shape of the plates 40, 42 may provide certain advantages. For example, it is believed that the shape of the plates 40, 42 may help accommodate growth of the plates during heating. Also, because the shape of the floor 74, it is believed that gaseous fluids, such as air or steam, may not be maintained along the center of the plate 40, but instead pass along the floor 74 to either side. A catenary plate also may have structural advantages relative to a planar plate when experiencing force loadings. Such advantages are not a necessary part of the disclosed vibratory apparatus 20, but may be recognized all the same in the illustrated embodiment.

The plates 40, 42 may be made of similar materials, or dissimilar materials. For example, the plate 40 may be made of copper, while the plate 42 may be made of mild steel. However, it is also believed that both plate 40 and plate 42 may be made of mild steel because of the ability of the vibratory apparatus 20 to dissipate heat loads, even when molten slag is transported or moved along the trough assembly 30.

The space 100 between the plates 40, 42 may be unobstructed, as illustrated. As such, the space 100 includes a single plenum or passage that extends from the first end 44 of the plates 40, 42 to the second end 46. Alternatively, one or more guides may be disposed into the space 100 to divide the space 100 into a plurality of passages, or to alter the shape of the passage. For example, a plurality of guides may be disposed longitudinally in the space 100 to define a plurality of passages, which passages may or may not be in fluid communication with each other laterally except at the ends 44, 46. Alternatively, guides or dampers may be disposed in the space at an angle to the longitudinal (e.g., laterally) to increase the length of the passage between the ends 44, 46, for example, by providing a serpentine path. As a still further alternative, fluid may flow in a first direction along a first pass, and then return in a second direction opposite the first direction along a second pass before exiting the assembly 30. Presently, it is believed that better performance may be achieved by keeping the space 100 free of obstructions.

At or near either end 44, 46 of the plates 40, 42 may be disposed a header tank 110, 112. In particular, the header tanks 110, 112 may have an aperture formed in a wall thereof which permits fluid communication between the tanks 110, 112 and the space 100 defined between the plates 40, 42. The header tanks 110, 112 may be joined to the plates 40, 42 by welding, for example, with the aperture in communication with the space 100.

During the process of moving fluid through the space 100 from the tank 110 to the tank 112, a phenomenon known as "water hammer" may occur. It will be recognized that motion of the vibratory apparatus 20 may cause surging of the fluid passing along the space 100 and in the tanks 110, 112. It is believed that collisions of the surges with the walls of the tanks 110, 112, as well as cavitation and suction occurring within the water column, can "hammer" tank walls and have a negative effect on part life.

Figure 4:
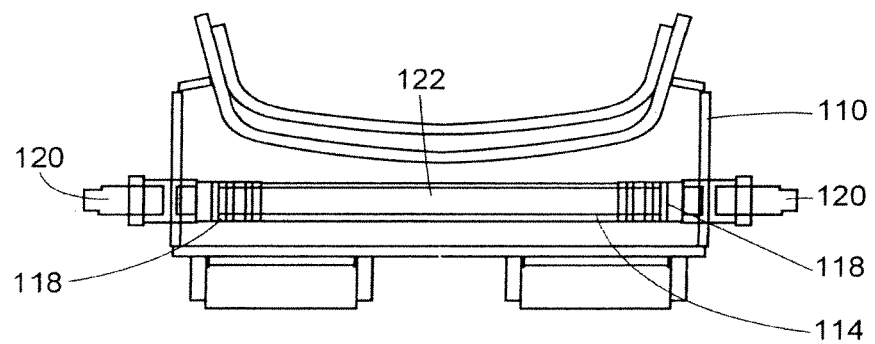
FIG. 4 is a cross-sectional view of one of the header tanks taken along line 4-4 in FIG. 1.

It is believed that the "water hammer" effect may be limited by disposing at least one flexible tube 114, 116 (e.g., defined by a breather hose) in the tanks 110, 112, respectively. As illustrated in FIG. 1, two tubes 114 are disposed in the tank 110, and two tubes 116 are disposed in tank 112. As seen in FIG. 4, the tube 114 is connected to two fittings 118 that are joined to the walls of the tank 110 inside the tank 110. Mufflers 120 are connected to the fittings 118 outside the tank 110. Similar assemblies would be present in tank 112 for the tubes 116.

The tubes 114, 116 thus have an inner space 122 that is not in fluid communication with the tanks 110, 112 while being disposed physically interior to the tanks 110, 112. This inner space 122 is, however, open to the space exterior to the tanks 110, 112. Thus, when a surge of fluid enters the tanks 110, 112, the surge acts on the wall of the tubes 114, 116, causing an exhaust of air out of the space 122 through the mufflers 120, thereby accommodating need for additional volume in the tank 110, 112. However, once the need for additional volume has passed, the tube 114, 116 may return to its normal shape.

While such a structure may be useful in limiting the effects of "water hammer," it is believed that the effects of "water hammer" are related to the mass of the water flowing through the space 100. Relying on this relation, a further reduction in the effect may be achieved, with or without the used of the tubes 114, 116, by limiting the mass of fluid passing through the space 100. This limitation of mass may be the result of a desire to increase the velocity of the fluid passing through the space 100 to a high velocity so as to consequently accommodate a significant heat load. That is, by joining the plates 40, 42 together in close proximity to increase the velocity of the fluid through the space 100, it is believed that a reduction in the mass of fluid subject to surging, cavitation and suction under the vibratory motion of the apparatus 20 may be reduced. It is believed that in this fashion, the effects of "water hammer" may be reduced such that use of the tubes 114, 116 may be optional. As one example, with molten slag being transported along the trough assembly 30 and water passing through the space 100 on the order of 50 gallons/minute, the distance between opposing surfaces 78, 86 of the plates 40, 42 may be approximately 12.7 mm (0.5 inches), which distance may be at least an order smaller than the distance between the side edges 52, 54 of the first and second plates 40, 42.

The header tanks 110, 112 also may each include at least one port 124, 126. In accordance with the flow of fluid in the system 22 (explained in greater detail below), the header tank 110 may be referred to as an inlet header tank, and the header tank 112 may be referred to as an outlet header tank. Consequently, the port 124 may be referred to as an inlet port, and the port 126 may be referred to as an outlet port. It will be recognized that if the flow were reversed, the tank 110 would become the outlet tank and the tank 112 would become the inlet tank, and the designation of the ports would also be reversed.

As discussed in greater detail below, the ports 124, 126 may be coupled to a fluid source or to a fluid exhaust. According to other embodiments, the fluid used as a coolant in the apparatus 20 may be recirculated, such that the fluid that passes through the fluid exhaust passes again into the fluid source. While reference may be made to a fluid source and a fluid exhaust, such reference should not be interpreted to exclude recirculation from the exhaust to the source.

As illustrated in FIGS. 1 and 2, the outlet port 126 of the outlet header tank 112 is disposed beyond the end 44 of the plates 40, 42. By contrast, as illustrated, the port 124 of the inlet header tank is disposed between the ends 44, 46 of the plates 40, 42. It is believed that certain advantages may be obtained by having the fluid traverse the length of the trough assembly 30 and exit beyond the first ends of the plates 40, 42, and thus beyond the feed point of the trough assembly 30.

Figure 5:
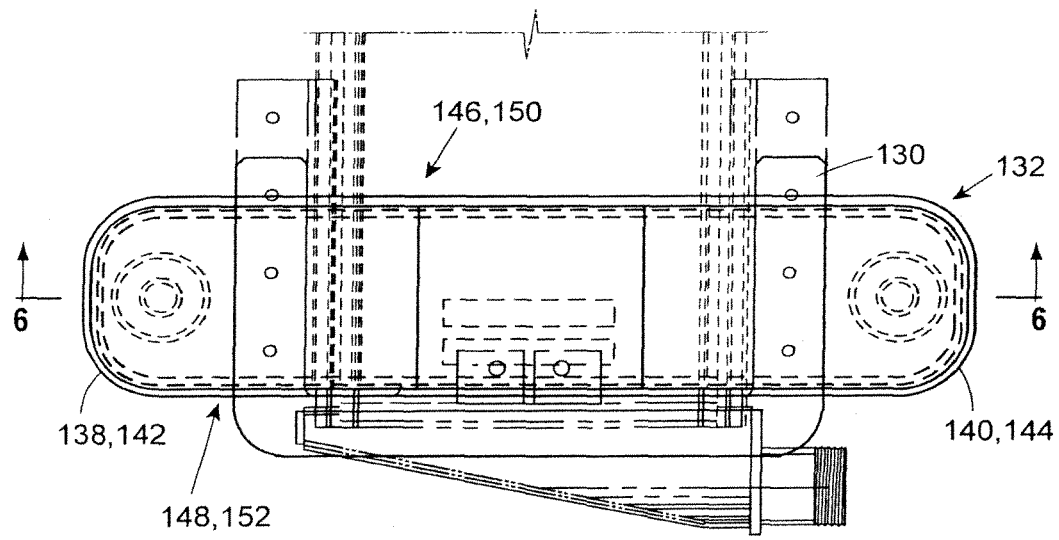
FIG. 5 is a plan view of the load plate assembly.
Figure 6:
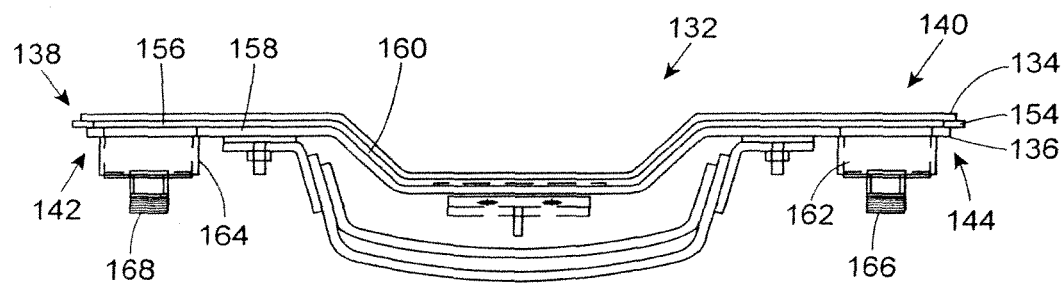
FIG. 6 is a cross-sectional view of the load plate assembly of FIG. 5 taken along line 6-6 in FIG. 5.

Attached to the plates 40, 42 (particularly, plate 42) are mounting brackets 130 for mounting a load plate assembly 132 (see FIGS. 5 and 6) to the combination of the plates 40, 42 as part of the trough assembly 30. The load plate assembly 132 includes a first plate 134 and a second plate 136. Each of the plates 134, 136 has opposing ends 138, 140, 142, 144 and opposing side edges 146, 148, 150, 152. The plates are joined together (by welding, for example) via a spacer 154 disposed between the nested plates 134, 136 with opposing surfaces 156, 158 facing each other to define a space 160 therebetween. Alternatively, the plates 134, 136 may be formed such that, when joined along the ends 138, 140, 142, 144 and side edges 146, 148, 150, 152, the surfaces 156, 158 of the plates 134, 136 are spaced from each other to define the space 160.

The plate 136 has two apertures formed therein. Port fittings 162, 164 are joined to the plate 136 proximate and in fluid communication with the apertures to define a first port 166 and a second port 168. The ports 166, 168 are thus in fluid communication with the space 160.

As illustrated, fluid flows into the first port 166, through the space 160, and then out of the second port 168. Thus, the first port 166 may be referred to as the inlet port, and the second port 168 may be referred to as the outlet port. It will be recognized that if the flow were reversed, then the inlet and outlet nomenclature would also be reversed.

The comments regarding the placement of baffles or other obstructions addressed above relative to the space 100 may apply to the space 160. That is, baffles or other obstructions may be placed within the space 160 to define parallel flow paths in the space (or passage or plenum) 160, or to lengthen the flow path between the first and second ports 166, 168. While such embodiments may have their applications, the embodiment as illustrated is obstruction-free.

Similarly, the ports 166, 168 may be coupled to a fluid source or to a fluid exhaust. According to other embodiments, the fluid used as a coolant in the load plate assembly 132 may be recirculated, such that the fluid that passes through the fluid exhaust passes again into the fluid source. While reference may be made to a fluid source and a fluid exhaust, such reference should not be interpreted to exclude recirculation from the exhaust to the source.

Returning to FIGS. 1 and 3, the combination of the trough plates 40, 42, the header tanks 110, 112 and load plate assembly 132 may be supported at various points along the length of the plates 40, 42 by support structures 180 and ribs 181. The support structures 180 and ribs 181 may extend laterally between the sides 56, 58 of the trough assembly 30. As shown in FIG. 3, the support structures 180 may have notches 182 formed in along a first edge 184 to accept the assembly of through plates 40, 42. The support structures 180 may be joined at the notches 182 to the surface 88 of plate 42. After a similar fashion, the ribs 181 may have notches that are joined to the surface 88 of the plate 42. The support structures 180 (and ribs 181) may also have plate 186 joined to the first edge 184 on either side 56, 58 of the trough assembly 30, and the support structures 180 may have a second plate 188 disposed along a second edge 190.

Attached to the first plate 186 are drive brackets 200, 202. As illustrated, the plates 186 and drive brackets 200, 202 may be joined using nut-and-bolt fasteners, although other joining methods may be used. While the drive brackets 200, 202 are triangular in shape, other shapes may be used in the alternative.

Attached to the drive brackets 200, 202 is a vibration generator 32, thereby coupling the vibration generator 32 to the trough assembly 30. As illustrated, each of the generators 32 may include an electric motor 210. The motors 210 may be operationally coupled to a controller 212. Each motor 210 has a shaft 214, which may be disposed at an angle to the trough assembly 30. Attached to each of the shafts 214 is a pair of eccentric masses 216. While vibration generators 32 utilizing eccentric masses 216 are illustrated, it will be recognized that other generators may be used in the alternative.

It will be recognized that the attachment of the vibration generator 32 to the drive brackets 200, 202 of the trough assembly 30 defines a single-mass or brute force arrangement. It will further be recognized that other arrangements are possible. For example, a resilient coupling may be established between the trough assembly 30 and the vibration generator 32 to define a two-mass arrangement.

Returning to the support structures 180, it will be noted that the second plate 188 along the second edge 190 of the support structures 180 may be joined to pairs of resilient members 220 (see FIG. 3). The resilient members 220 may, in turn, be joined to the frame 34, which may include longitudinally-oriented members 222 joined by cross-members 224. Thus, the trough assembly 30 may be resiliently coupled to the frame 34 via the resilient members 220. The resilient members 220 may be coil springs, as illustrated, although it will be recognized that other alternative structures exist.

Figure 7:
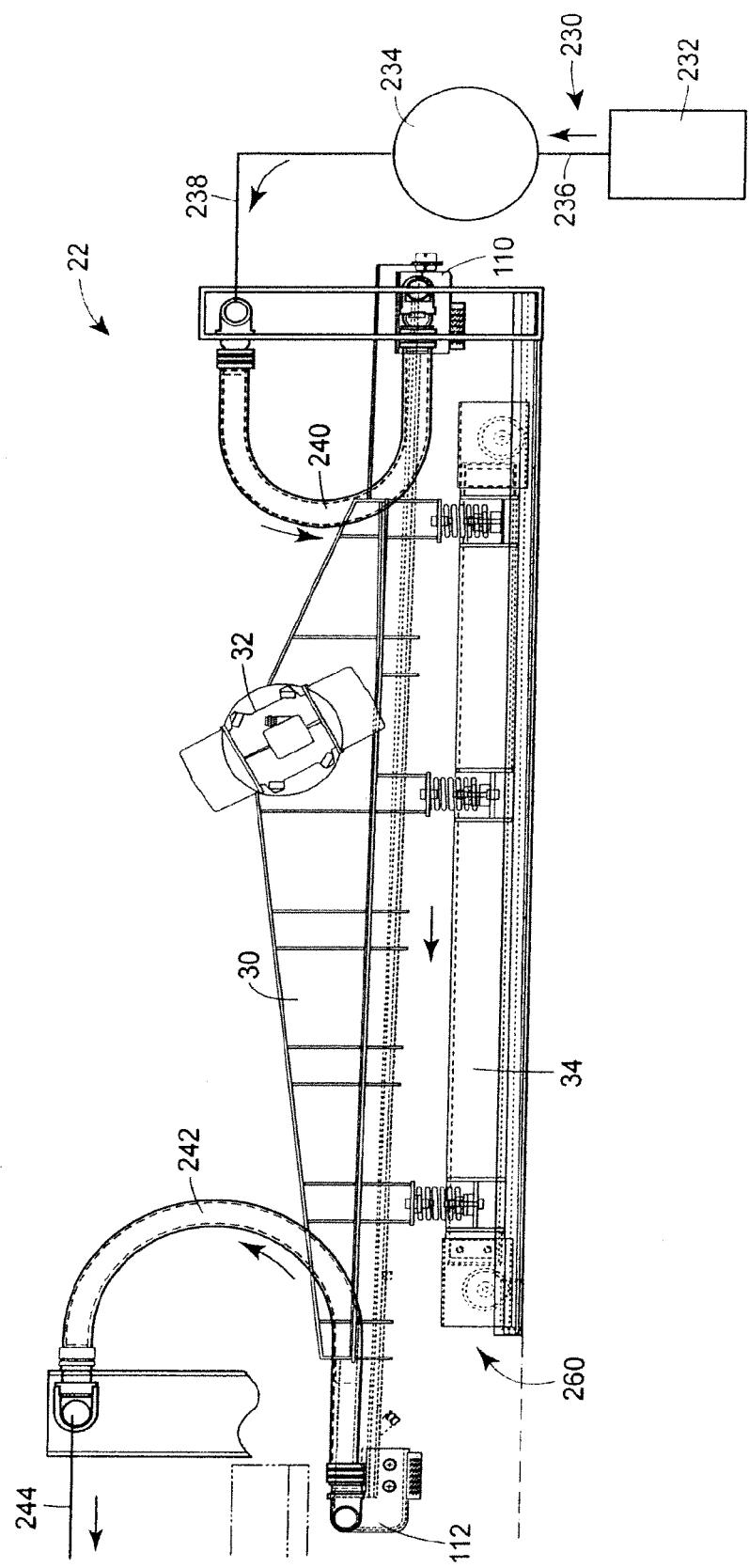
FIG. 7 is a schematic diagram of the vibratory apparatus and fluid transport subsystem, illustrating fluid flow through the vibratory apparatus of FIG. 1.

Having thus described the vibratory apparatus 20, the system 22 (of which the vibratory apparatus 20 is part) is now discussed with reference to FIGS. 1, 3, and 7.

The system 22 includes a fluid transport subsystem 230 to move fluid through the space 100 and the tanks 110, 112 to cool the trough plates 40, 42 (particularly, plate 40). The fluid transport subsystem 230 includes a tank 232, in which a volume of fluid is contained. The fluid transport subsystem 230 also includes a pump 234, which has an inlet coupled to the tank 232 to be in fluid communication with the tank 232. The pump 234 also has an outlet coupled to the tank 110 to be in fluid communication with the tank 110.

Specifically, lines 236, 238, 240 couple the pump 234 to the tanks 110, 232, while lines 242, 244 connect the tank 112 to an exhaust (which, as discussed above, may in certain embodiments be coupled to the tank 232 to recirculate the cooling fluid). While the lines 236, 238, 240, 242, 244 may include hoses, for example, the lines 236, 238, 240, 242, 244 may also include devices such as couplings, fittings, filters, etc.

It will be noted that fluid (which may be water, for example) is passed along the fluid transport subsystem 230 and through the vibratory apparatus 20 from right to left. That is, fluid is drawn from the tank 232 by the pump 234 via line 236, and exhausted through lines 238, 240 into tank 110 via the inlet port 124. The fluid then flows from tank 110 through the space 100 to the tank 112. The tank 110 may be at a slightly lower elevation relative to the tank 112 to permit gaseous fluids (such as air or steam) to pass upwards along the space 100 and exit from the tank 112. Exiting the tank 112 via the outlet port 126, the fluid passes through the lines 242, 244 to the exhaust. Thus, the fluid moves in a first longitudinal direction along the apparatus 20.

By contrast, heated material, such as molten slag, is fed onto the trough plates 40, 42 (particularly, plate 40 via the load plate assembly 132) at a feed point at the first end 48 of the trough assembly 30, and from there moved (upon actuation of the vibration generator 32) along the trough assembly 30 to a discharge point at the second end 50, or from left to right. Thus, while the molten slag also moves in a longitudinal direction along the apparatus 20, the direction of motion of the fluid in the space 100 is opposite the direction of motion of the slag along the plate 40.

The system 22 also includes a mechanical transport subsystem 260 to permitting the movement of the vibratory apparatus 20 relative to ground. As seen in FIG. 3, the mechanical transport subsystem 260 includes a pair of spaced rails 262, 264 that are disposed longitudinally at either side 56, 58 of the trough assembly 30 and below the frame 34. The rails 262, 264 each include a pair of L-shaped angles 266, 268, 270, 272. The first angles 266, 270 of each rail 262, 264 are disposed with one of the legs 274, 276 disposed flat on the ground. The second angle 268, 272 is then disposed on and joined to a surface 278, 280 of the legs 274, 276 with the vertex 282, 284 of the angle 268, 272 oriented upwardly.

The mechanical transport subsystem 260 may also include two pairs of wheels 290, 292 (see, e.g., FIG. 1). The wheels 290, 292 are joined to the longitudinal members 222 of the frame 34, with one wheel of each pair of wheels 290 at either end of the frame 34. The wheels 290, 292 each have a groove formed about the periphery thereof to accept the vertex 282, 284 of the angles 268, 272 therein. The wheels 290, 292 and the frame 34 thus define a carriage for the apparatus 20 on which the apparatus 20 may move relative to the ground on the rails 262, 264.

According to the illustrated embodiment, the mechanical transport subsystem 260 may also include a linear drive, in the form of a pneumatic cylinder 300, which may be controlled by a controller (not shown). Specifically, the hydraulic cylinder 300 may include a piston 302 that has a first end received within a cylinder 304. A second end 306 of the piston 302 is attached to the frame 34, while an end 308 of the cylinder 304 is coupled to the ground. The position of the apparatus 20, for example relative to a feed spout for molten slag and a discharge chute, may be varied by varying the distance between the ends 306, 308. It will be recognized that other linear drives may also be used; for example, a hydraulic cylinder may be used.

It will also be recognized that the vibratory apparatus 22 may be operated without provision of the mechanical transport subsystem 260, just described. In such an alternative embodiment, the frame 34 may be disposed on and joined to the ground. According to such an alternative embodiment, the frame 34 may be referred to as a base.

We claim:

1. A vibratory apparatus comprises:
    a trough assembly comprising first and second plates, the first and second plates joined together in close proximity so as to define a space through which a fluid may pass at a high velocity, the first plate having a floor surface on which a hot material to be moved along the trough assembly is directly deposited is made of mild steel;
    a load plate assembly fixedly mounted to the trough assembly adjacent a feed point, the hot material to be moved along the trough deposited first on the load plate assembly and then on the trough assembly,
    the load plate assembly comprising first and second plates being joined together to define a space between opposing surfaces of the first and second plates, and inlet and outlet ports in fluid communication with the space formed between the opposing surfaces of the first and second plates of the load plate assembly;
    a vibration generator coupled to the trough assembly to continuously move the hot material along the trough assembly to an end of the trough assembly; and
    a frame resiliently coupled to the trough assembly.

2. The vibratory apparatus according to claim 1, wherein the first and second plates of the trough assembly comprise mild steel.

3. The vibratory apparatus according to claim 1, wherein the first and second plates of the trough assembly have side edges that are joined together, and the distance between opposing surfaces of the first and second plates of the trough assembly is at least an order smaller than the distance between the side edges of the first and second plates of the trough assembly.

4. The vibratory apparatus according to claim 1, comprising an inlet header tank and an outlet header tank, the inlet and outlet header tanks in fluid communication with the space of the trough assembly.

5. The vibratory apparatus according to claim 4, wherein the space of the trough assembly comprises a single plenum having a first end in fluid communication with the inlet header tank and a second end in fluid communication with the outlet header tank.

6. The vibratory apparatus according to claim 5, wherein the single plenum is unobstructed from the first end to the second end.

7. The vibratory apparatus according to claim 4, wherein the trough assembly has a first end with the feed point and a second end with a discharge point, the outlet header tank disposed at the first end and the inlet header tank disposed at the second end.

8. The vibratory apparatus according to claim 4, comprising:
    at least one tube disposed in at least one of the inlet and outlet header tanks, the tube having an inner space that is not in fluid communication with the at least one of the inlet and outlet header tanks and that is open to a space exterior to the at least one of the inlet and outlet header tanks.

9. The vibratory apparatus according to claim 8, comprising at least two tubes disposed in each of the inlet and outlet header tanks, the at least two tubes each having an inner space that is not in fluid communication with the inlet or outlet header tanks and that is open to a space exterior to the inlet or outlet header tanks.

10. The vibratory apparatus according to claim 4, wherein:
    the outlet header tank has an outlet port, and the outlet port of the outlet header tank is disposed beyond an end of the first and second plates of the trough assembly.

11. The vibratory apparatus according to claim 1, wherein the first and second plates of the trough assembly comprise catenary plates.

12. A system comprising:
a vibratory apparatus comprising:
   a trough assembly comprising first and second plates, the first and second plates joined together in close proximity so as to define a space through which a fluid may pass at a high velocity, the first plate having a floor surface on which a hot material to be moved along the trough assembly is directly deposited is made of mild steel,
   a load plate assembly fixedly mounted to the trough assembly adjacent a feed point, the hot material to be moved along the trough deposited first on the load plate assembly and then on the trough assembly,
   the load plate assembly comprising first and second plates being joined together to define a space between opposing surfaces of the first and second plates, and inlet and outlet ports in fluid communication with the space formed between the opposing surfaces of the first and second plates of the load plate assembly;
   a vibration generator coupled to the trough assembly to continuously move the hot material along the trough assembly to an end of the trough assembly, and
   a frame resiliently coupled to the trough assembly; and
a pump having an inlet in fluid communication with a fluid source and an outlet in fluid communication with the space of the trough assembly.

13. The system according to claim 12, comprising:
a carriage comprising at least two pairs of wheels and the frame, one of each of the pairs of wheels joined to the frame on one of the opposing sides of the trough assembly; and
a pair of spaced rails, the wheels joined to the carriage on the one of the opposing sides disposed along one of the pair of spaced rails.

14. The system according to claim 12, comprising:
a controller coupled to the vibration generator.

15. The vibratory apparatus according to claim 12, wherein the first and second plates of the trough assembly comprise mild steel.

16. The vibratory apparatus according to claim 12, wherein the first and second plates of the trough assembly have side edges that are joined together, and the distance between opposing surfaces of the first and second plates of the trough assembly is at least an order smaller than the distance between the side edges of the first and second plates of the trough assembly.

* * * * *